United States Patent
Edar et al.

(10) Patent No.: US 11,843,984 B2
(45) Date of Patent: Dec. 12, 2023

(54) SYSTEM AND METHOD FOR ROAMING BETWEEN ACCESS POINTS

(71) Applicant: ZEBRA TECHNOLOGIES CORPORATION, Lincolnshire, IL (US)

(72) Inventors: Mahesh Kumar Edar, Davanagere (IN); Venkata Aneel Kumar Inuganti, Bangalore (IN); Darpan Majumder, Bangalore (IN); Surya Kantha Rao Kandoti, Bangalore (IN); Naga Babu Parsi, Bangalore (IN); Kishore Kumar Pathankanur, Bangalore (IN); Sateesh V. Angadi, Bangalore (IN); Mahendiran Balasubramaniyam, Bangalore (IN)

(73) Assignee: Zebra Technologies Corporation, Lincolnshire, IL (US)

(*) Notice: Subject to any disclaimer, the term of this patent is extended or adjusted under 35 U.S.C. 154(b) by 0 days.

(21) Appl. No.: 17/556,643

(22) Filed: Dec. 20, 2021

(65) Prior Publication Data

US 2023/0199587 A1 Jun. 22, 2023

(51) Int. Cl.
| | |
|---|---|
| *H04W 36/08* | (2009.01) |
| *H04W 48/20* | (2009.01) |
| *H04W 76/34* | (2018.01) |
| *H04W 36/00* | (2009.01) |
| *H04W 48/16* | (2009.01) |
| *H04W 76/38* | (2018.01) |

(52) U.S. Cl.
CPC ..... *H04W 36/00835* (2018.08); *H04W 36/08* (2013.01); *H04W 48/16* (2013.01); *H04W 76/38* (2018.02)

(58) Field of Classification Search
CPC ........... H04W 36/00835; H04W 36/08; H04W 36/10; H04W 36/14; H04W 48/16; H04W 48/20; H04W 76/34; H04W 76/38
See application file for complete search history.

(56) References Cited

U.S. PATENT DOCUMENTS

| | | | |
|---|---|---|---|
| 7,715,800 B2 | 5/2010 | Sinha | |
| 8,487,516 B2 * | 7/2013 | Brisebois | .............. H04W 16/32 310/370 |

(Continued)

OTHER PUBLICATIONS

International Search Report and Written Opinion for International Application No. PCT/IN2022/51107 dated Apr. 18, 2023.

*Primary Examiner* — Andrew Wendell

(57) ABSTRACT

A mobile computing device including: a wireless communications interface configured to connect to a home access point; a controller configured to: control the wireless communications interface to initiate a scan for foreign access points and select a new access point from among the foreign access points; when the scan is complete, control the wireless communications interface to return to the home access point and initiate a home channel dwell time; control the wireless communications interface to receive data packets from the home access point during the home channel dwell time; and in response to a predefined criterion being met, control the wireless communications interface to connect to the new access point prior to expiry of the home channel dwell time.

18 Claims, 4 Drawing Sheets

(56) References Cited

U.S. PATENT DOCUMENTS

| | | |
|---|---|---|
| 2005/0047371 A1* | 3/2005 | Bennett .......... H04W 36/00835 |
| | | 370/331 |
| 2006/0187873 A1 | 8/2006 | Friday et al. |
| 2014/0064140 A1* | 3/2014 | Chhabra ............... H04W 48/20 |
| | | 370/254 |
| 2014/0233406 A1* | 8/2014 | Chhabra ............... H04W 48/16 |
| | | 370/252 |
| 2015/0223136 A1* | 8/2015 | Gao ................ H04W 36/00835 |
| | | 455/436 |
| 2016/0105900 A1* | 4/2016 | Zhang ............... H04W 72/0446 |
| | | 370/338 |
| 2016/0227478 A1* | 8/2016 | Montemurro ..... H04W 52/0216 |
| 2017/0346668 A1 | 11/2017 | Kenney et al. |
| 2018/0070295 A1* | 3/2018 | Henry ................... H04W 48/16 |
| 2022/0070692 A1* | 3/2022 | Saini ..................... H04W 48/02 |
| 2022/0201596 A1* | 6/2022 | Zhou ..................... H04W 48/16 |

* cited by examiner

SYSTEM AND METHOD FOR ROAMING BETWEEN ACCESS POINTS

BACKGROUND

Wireless networks may be serviced by several access points to which mobile devices can connect based on their location within the wireless network. As users of mobile devices move around, the mobile devices may roam to different access points. However, roaming between access points may result in lost data packets while the device connects to the new access point.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
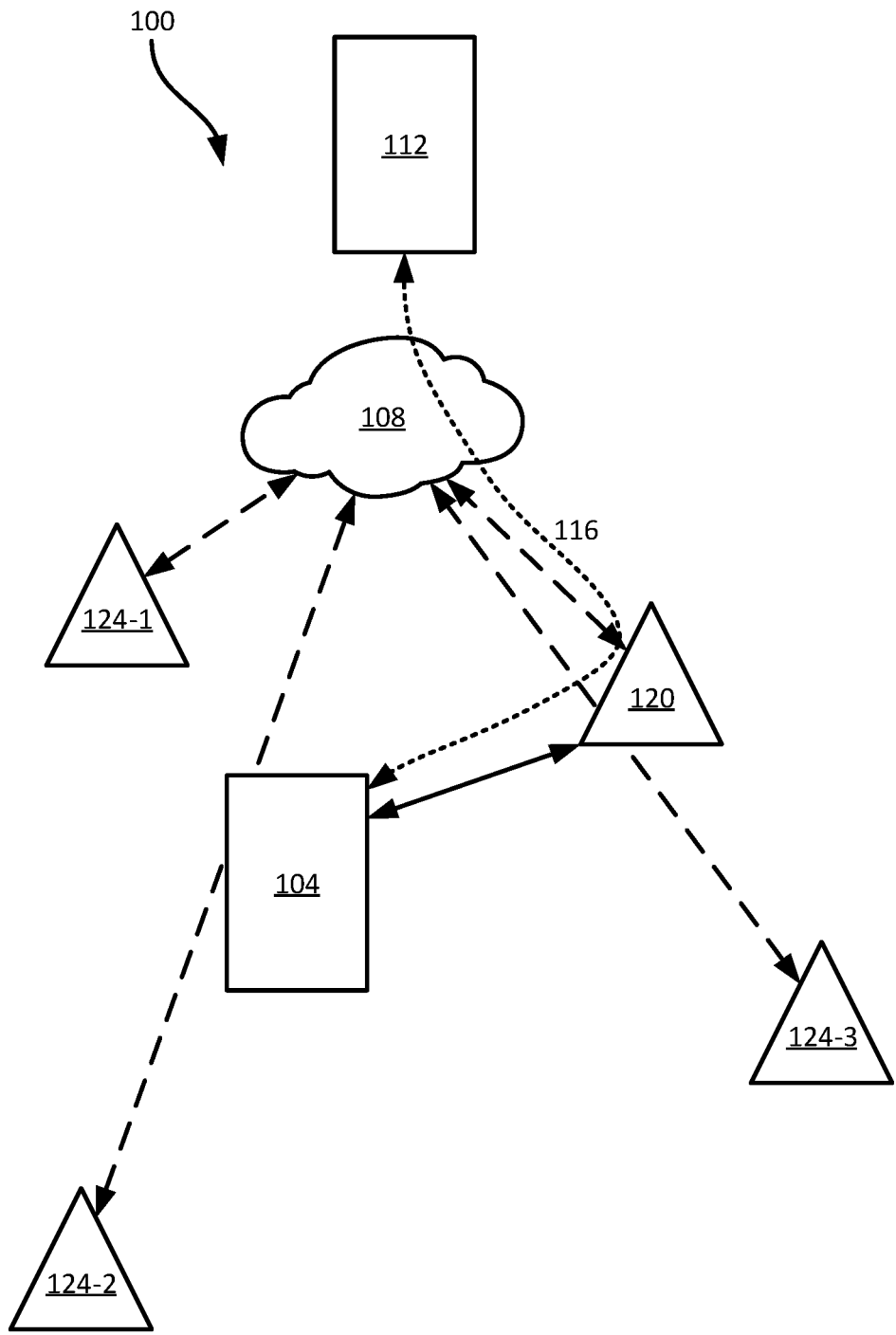
FIG. 1 is a schematic diagram of a system for roaming between access points.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Examples disclosed herein are directed to a mobile computing device comprising: a wireless communications interface configured to connect to a home access point; a controller configured to: control the wireless communications interface to initiate a scan for foreign access points and select a new access point from among the foreign access points; when the scan is complete, control the wireless communications interface to return to the home access point and initiate a home channel dwell time; control the wireless communications interface to receive data packets from the home access point during the home channel dwell time; and in response to a predefined criterion being met, control the wireless communications interface to connect to the new access point prior to expiry of the home channel dwell time.

Additional examples disclosed herein are directed to a method comprising: initiating, at a wireless communications interface connected to a home access point, a scan for foreign access points and selecting a new access point from among the foreign access points; when the scan is complete, returning to the home access point and initiating a home channel dwell time; receiving data packets from the home access point during the home channel dwell time; and in response to a predefined criterion being met, connecting to the new access point prior to expiry of the home channel dwell time.

Additional examples disclosed herein are directed to a system a home access point; at least one foreign access point; a mobile computing device connected to the home access point, the mobile computing device comprising: a wireless communications interface; a controller configured to: control the wireless communications interface to initiate a scan of the foreign access points and select a new access point from among the foreign access points; when the scan is complete, control the wireless communications interface to return to the home access point and initiate a home channel dwell time; control the wireless communications interface to receive data packets from the home access point during the home channel dwell time; and in response to a predefined criterion being met, control the wireless communications interface to connect to the new access point prior to expiry of the home channel dwell time.

FIG. 1 depicts a system 100 in accordance with the teachings of this disclosure. The system 100 includes a mobile computing device 104 (also referred to herein as simply the device 104) connected to a network 108. The device 104 may communicate with a second computing device 112 via a link 116 which traverses the network 108. In some examples, the device 112 may be remote from the device 104 and the link 116 may therefore additionally traverse one or more wide-area networks such as the Internet, mobile networks and the like.

The device 104 may be a mobile computing device such as a handheld computer, a mobile phone, a tablet, a barcode scanner, or the like. As noted above, the device 104 is connected to the network 108, which may be deployed for wireless communications within a facility, such as a transportations and logistics facility, a warehouse, retail establishment, or other facility. Accordingly, the network 108 may be a wireless local area network (WLAN), such as a WiFi network, a mesh network, or the like deployed by one or more access point. In the present example, four example access points, a home access point 120, and three foreign access points 124-1, 124-2, and 124-3 are depicted. In other examples, the network 108 may include more or fewer access points.

In particular, the device 104 may be currently serviced by the home access point 120 to connect to the network 108. The home access point 120 is the access point to which the device 104 is currently connected and stores the current communications session between the device 104 and, for example, the device 112. Since the device 104 is mobile, the device 104 may be carried about by a user. As the user of the device 104 moves about the facility or other region serviced by the network 108, the connection of the device 104 to the home access point 120 may weaken, and the device 104 may be better serviced by another foreign access point 124 of the network 108. Accordingly, the device 104 may roam to one of the foreign access points 124 to connect to the network 108, for example when the device 104 is out of range of the home access point 120 and/or when a better connection may be achieved via one of the foreign access points 124.

To roam to a foreign access point 124 from the home access point 120, the device 104 may periodically scan for foreign access points 124 to which it may connect. For example, in the presently illustrated example, the device 104 is closer to the access point 124-1, and hence a scan for foreign access points may select the access point 124-1 as a new access point to utilize to connect to the network 108. While the device 104 scans for foreign access points 124, the device 104 may temporarily disconnect from the home access point 120, and hence any communications and data transmissions to and from the device 104 may be temporarily disrupted. Accordingly, to maintain data transmissions, the home access point 120 may buffer data packets to be sent to the device 104. Upon completion of the scan, the device 104 returns to the home access point 120 for a predetermined amount of time, known as the home channel dwell time. During the home channel dwell time, the device 104 receives the buffered data packets and any new incoming data packets received during that time. Upon expiry of the home channel dwell time, the device 104 may then move to the selected new access point (i.e., the foreign access point 124-1) for subsequent communications. However, when the device 104 moves to the new access point 124-1, any packets received while the device 104 is authenticating with the new access point 124-1 and after the home dwell time has expired will be lost. This may result, for example, in breaks in the audio and/or video in an ongoing voice call.

In order to reduce the number of packets lost, in accordance with the teachings of the present disclosure, the device 104 may move to the new access point 124-1 prior to the expiry of the home channel dwell time when the data packets received during the home channel dwell time meet a predefined criterion. In particular, when the device 104 determines that no further data packets will be received within the home channel dwell time, the device 104 may initiate the authentication and connection with the new access point 124-1 prior to the expiry of the home channel dwell time. The device 104 may make this determination based at least in part on standard properties of packet traffic, such as the predefined minimum time interval between successive packets. In particular, if the device 104 receives a packet within the predefined time interval prior to the end of the home channel dwell time, the device 104 may determine that any subsequent packet would arrive after the expiry of the home channel dwell time, and hence would have been dropped. Accordingly, rather than continuing to wait until the home channel dwell time expires, the device 104 may proactively connect to the new access point 124-1 after receipt of a data packet within the predefined time interval prior to the end of the home channel dwell time. This may allow the device 104 to connect to the new access point 124-1 sooner, and hence may allow the device 104 to pick up additional packets which otherwise may have been missed while the device 104 was still in the process of transitioning from the home access point 120 to the new access point 124-1.

Figure 2:
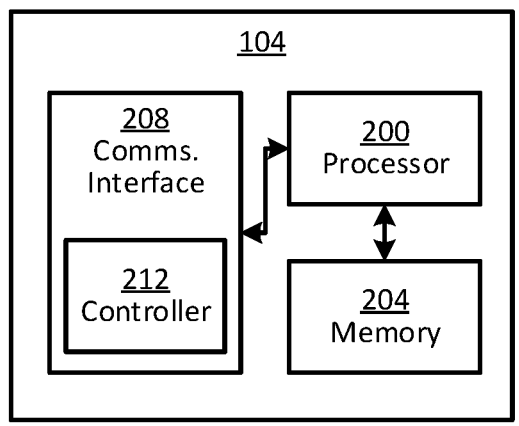
FIG. 2 is a block diagram of certain internal hardware components of the detection device of FIG. 1.

Turning now to FIG. 2, certain internal components of the computing device 104 are illustrated. The device 104 includes a processor 200 interconnected with a non-transitory computer-readable storage medium, such as a memory 204. The memory 204 includes a combination of volatile memory (e.g. Random Access Memory or RAM) and non-volatile memory (e.g. read only memory or ROM, Electrically Erasable Programmable Read Only Memory or EEPROM, flash memory). The processor 200 and the memory 204 may each comprise one or more integrated circuits. The memory 204 stores computer-readable instructions for execution by the processor 200, including one or more applications which, when executed, configure the processor 200 to perform the various functions of the device 104.

The device 104 further includes a communications interface 208 enabling the device 104 to exchange data with other computing devices, such as the device 112. The communications interface 208 is interconnected with the processor 200. The communications interface 208 includes a controller 212, and one or more antennas, transmitters, receivers, or the like (not shown), to allow the device 104 to communicate with other computing devices such as the device 112 via the link 116. The controller 212 may be a micro-controller, a micro-processor, or other suitable device capable of executing computer-readable instructions to control the components, such as the antennae, transmitters, receivers, and the like, of the communications interface 208 to perform the functionality described herein. The controller 212 may comprise one or more integrated circuits and may include and/or be interconnected with a non-transitory computer-readable storage medium storing computer-readable instructions which when executed configure the controller 212 and/or the communications interface 208 to perform the functionality described herein.

The device 104 may further include one or more input and/or output devices (not shown) suitable to allow an operator to interact with the device 104. The input devices may include one or more buttons, keypads, touch-sensitive display screens or the like for receiving input from an operator. The output devices may further include one or more display screens, sound generators, vibrators, or the like for providing output or feedback to an operator.

Figure 3:
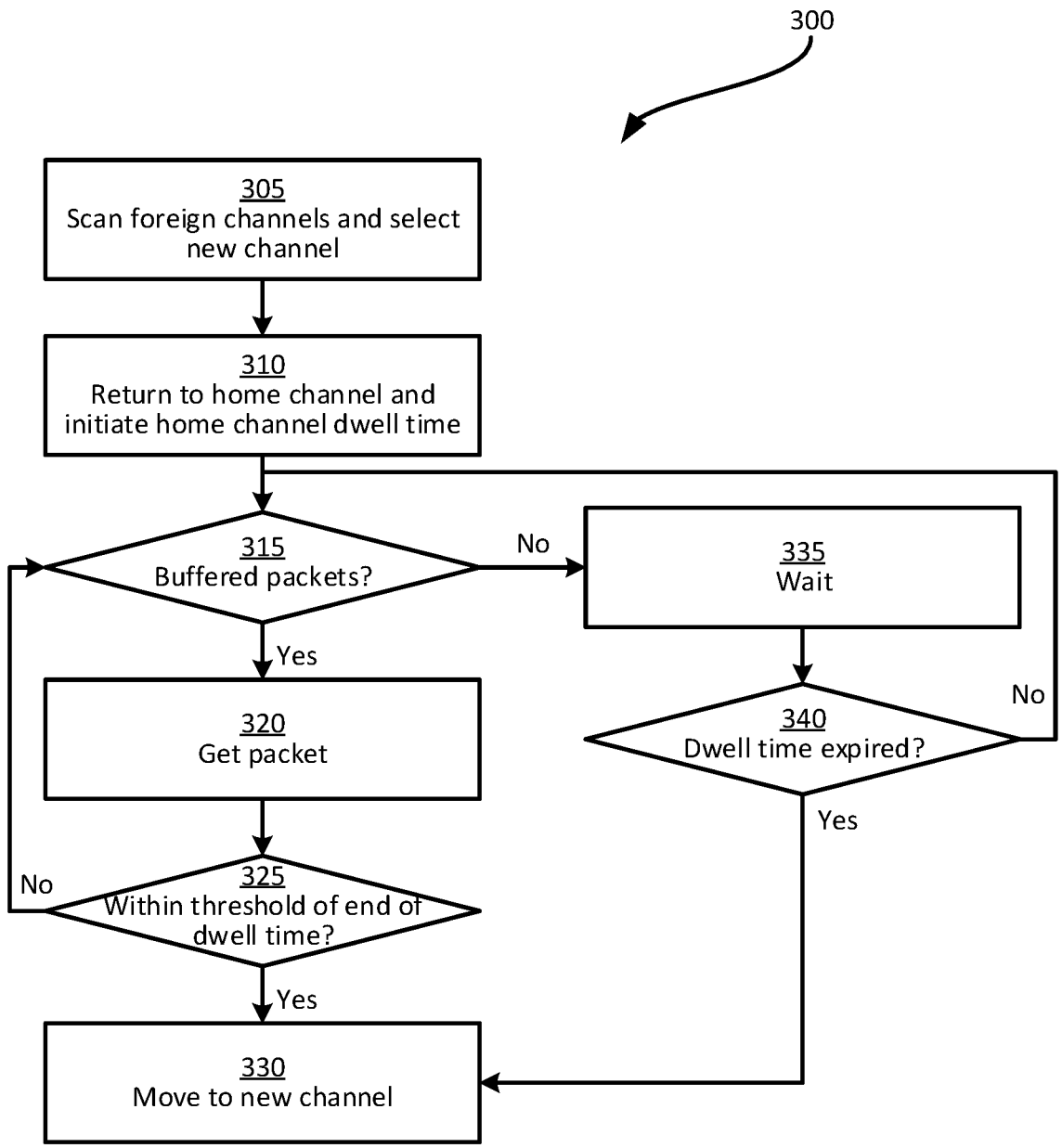
FIG. 3 is a flowchart of a method for roaming between access points.

Turning now to FIG. 3, the functionality implemented by the device 104 will be discussed in greater detail. FIG. 3 illustrates a method 300 of roaming to a foreign channel from a home channel in accordance with the present disclosure. The method 300 will be discussed in conjunction with its performance in the system 100, and particularly by the communications interface 208 and the controller 212 of the device 104. In particular, the method 300 will be described with reference to the components of FIGS. 1 and 2. In other examples, the method 300 may be performed by the processor 200 rather than the controller 212, and/or by other suitable devices.

The method 300 is initiated at block 305, where the controller 212 controls the communications interface 208 to initiate a scan for foreign access points 124. Block 305 may be initiated, for example, in response to the signal strength between the device 104 and the home access point 120 dropping below a threshold level. In other examples, other trigger conditions are also contemplated. After completing the scan, the controller 212 may determine whether any of the foreign access points 124 are appropriate to designate as a new access point. For example, the controller 212 may compare the signal strength of each of the foreign access points 124 to a threshold signal strength and/or to the signal strength of the current home access point 120. If the controller 212 determines that one of the foreign access points 124 is better suited to connect the device 104 to the network 108, then the controller 212 selects the foreign access point as a new access point.

At block 310, when the scan of the foreign access points 124 is complete, the controller 212 controls the communications interface 208 to return to its connection with the home access point 120. Further, once the device 104 is reconnected to the home access point 120, the controller 212 initiates a home channel dwell time. For example, the controller 212 may initiate a timer at the time of reconnection to the home access point 120.

At block 315, if there are data packets to be received from the home access point 120, the method 300 proceeds to block 320. The data packets may be buffered data packets which were buffered at the home access point 120 while the communications interface 208 was performing the scan at block 305, or the data packets may be new data packets received during the home channel dwell time.

At block 320, having determined that there are data packets to be received from the home access point, the communications interface 208 receives a data packet. In particular, the communications interface 208 receives a single data packet at a time, in accordance with standard network traffic rules.

At block 325, after completing receipt of the data packet at block 320, the controller 212 determines whether the data packet meets a predefined criterion. For example, the controller 212 may make a determination, based on the most recently received data packet, whether any further data packets may be received within the home channel dwell time.

If the data packet received at block 320 was received within a threshold time of the end of the home channel dwell time, the controller 212 may determine that no further packets will be received within the home channel dwell time. In particular, the threshold time may be based on the standard, predefined time interval between successive packets. Thus, if the data packet received at block 320 is received within the predefined time interval prior to the end of the home channel dwell time, then the next packet will be received outside of the home channel dwell time, and hence the controller 212 makes an affirmative determination at block 325.

Figure 4:
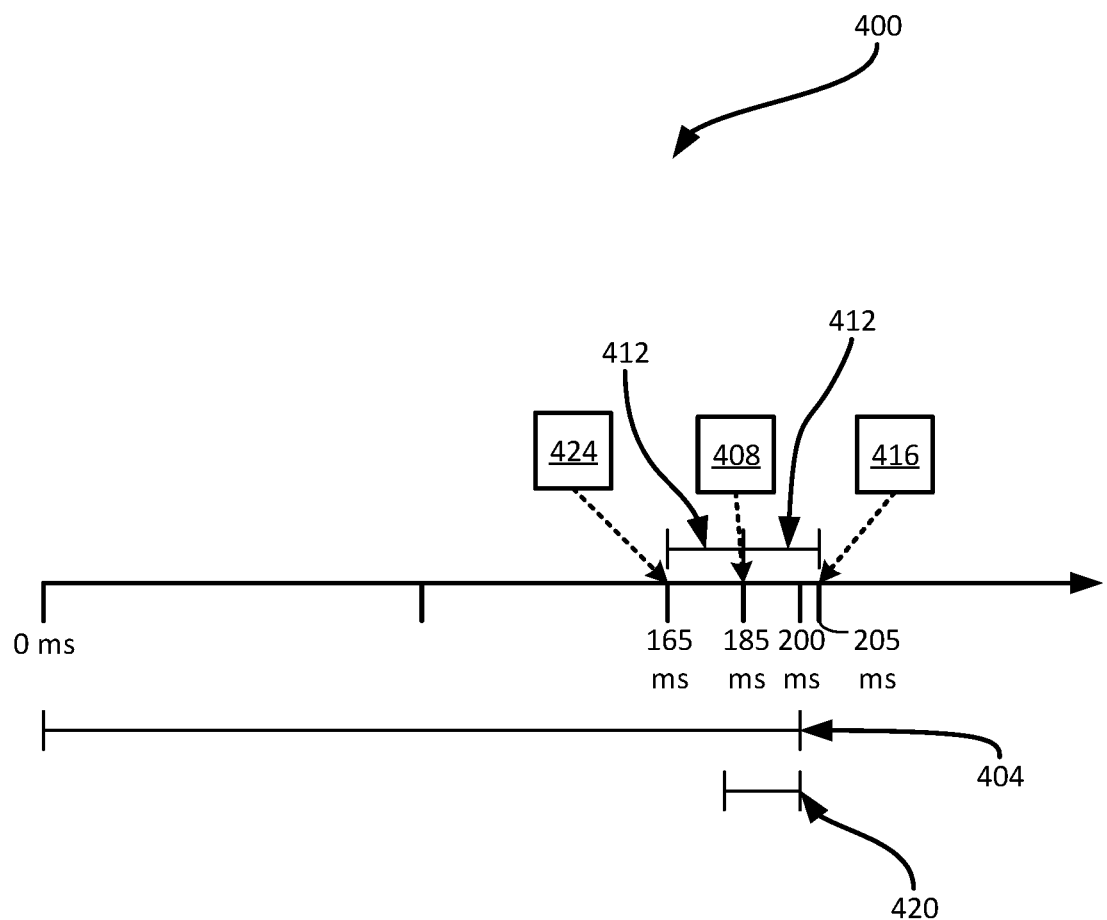
FIG. 4 is a schematic diagram of an example timeline and home channel dwell time while roaming between access points.

For example, referring to FIG. 4, a schematic timeline 400 is depicted. The timeline 400 depicts a home channel dwell time 404 of 200 milliseconds (ms). The device 104 may receive a data packet 408 at 185 ms after the start of the home channel dwell time 404. A predefined time interval 412 between successive packets may be 20 ms, and hence a subsequent data packet 416 may not be received until 205 ms after the start of the home channel dwell time 404, or 5 ms after the end of the home channel dwell time 404. Thus, the controller 212 may define a threshold time 420 prior to the end of the home channel dwell time 404, which is equal to the predefined time interval 412 between packets. If a data packet is received within the threshold time 420 prior to the end of the home channel dwell time 404, the controller 212 may safely determine that no further data packets will be received within the home channel dwell time 404.

If the data packet received at block 320 is received before the threshold time of the end of the home channel dwell time, the controller 212 may determine that further packets may be received within the home channel dwell time. That is, if the subsequent data packet is received at that predefined time interval, the time of receipt of the subsequent data packet will still be within the home channel dwell time. Thus, if the data packet received at block 320 is received prior to the predefined time interval prior to the end of the home channel dwell time, then the next packet may still be received within the home channel dwell time, and hence the controller 212 makes a negative determination at block 325.

For example, referring again to FIG. 4, the device may have received a previous data packet 424 at 165 ms after the start of the home channel dwell time 404. At the time of receipt of the previous data packet 424, the controller 212 may determine that a subsequent data packet (i.e., the data packet 408) may be received at 185 ms after the start of the home channel dwell time 404. Since this is still within the home channel dwell time 404, the controller 212 determines that further data packets may still be received within the home channel dwell time, and hence the controller 212 makes a negative determination at block 325. In particular, the controller 212 may make such a determination for any data packets received outside of (i.e., prior to) the threshold time 420 prior to the end of the home channel dwell time 404.

Returning to FIG. 3, if the determination at block 325 is negative, that is, that the data packet was received outside of the threshold time prior to the end of the home channel dwell time, and a subsequent packet may still be received within the home channel dwell time, then the controller 212 returns to block 315 to determine whether there are any additional data packets to be received.

If the determination at block 325 is affirmative, that is, that the data packet was received within the threshold time prior to the end of the home channel dwell time, and a subsequent packet will not be received within the home channel dwell time, then the controller 212 proceeds to block 330.

At block 330, the controller 212 controls the communications interface 208 to connect to the new access point 124-1 selected at block 305. In particular, when block 330 is performed in response to an affirmative determination at block 325, the communications interface 208 connects to the new access point 124-1 prior to expiry of the home channel dwell time. Thus, for example, referring again to FIG. 4, after receiving the data packet 408, rather than waiting an additional 15 ms for the home channel dwell time 404 to expire, the device 104 may connect to the new access point 124-1, which reduces the lag between connection points by 15 ms—that is, the device 104 may connect to the new access point 124-1 15 ms earlier than traditional models in which the device 104 waits for the expiry of the home channel dwell time 404. Accordingly, the additional 15 ms of connection at the new access point 124-1 may enable the device 104 to receive an additional data packet which may otherwise have been lost or dropped while the device 104 was roaming between access points.

Returning again to FIG. 3, at block 335, if there are no data packets to be received from the home access point 120 at block 315, the device 104 waits for either the home channel dwell time to expire, or for a data packet to be received from the home access point 120. For example, the controller 212 may proceed to block 340 to periodically check if the home channel dwell time has expired. If the home channel dwell time has not expired, the controller 212 returns to block 315 to determine whether there are any new packets to be received from the home access point 120.

If at block 340, the home channel dwell time has expired, the controller 212 continues to block 330 to connect to the new access point selected at block 305.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A mobile computing device comprising:
   a wireless communications interface configured to connect to a home access point;
   a controller configured to:
      control the wireless communications interface to initiate a scan for foreign access points and select a new access point from among the foreign access points;
      when the scan is complete, control the wireless communications interface to return to the home access point and initiate a home channel dwell time;
      control the wireless communications interface to receive data packets from the home access point during the home channel dwell time; and
      in response to a predefined criterion being met, control the wireless communications interface to connect to the new access point prior to expiry of the home channel dwell time.

2. The mobile computing device of claim 1, wherein the controller is configured to: when the data packets do not meet the predefined criterion, wait for the home channel dwell time to expire; and in response to the expiry of the home channel dwell time, control the wireless communications interface to connect to the new access point.

3. The mobile computing device of claim 1, wherein the predefined criterion comprises a determination that no further data packets will be received within the home channel dwell time.

4. The mobile computing device of claim 1, wherein the predefined criterion comprises a determination that a most recently received data packet is received within a threshold time of an end of the home channel dwell time.

5. The mobile computing device of claim 4, wherein the threshold time is a predefined time interval between successive packets.

6. The mobile computing device of claim 1, wherein data packets comprise data packets buffered at the home access point during the scan.

7. A method comprising:
   initiating, at a wireless communications interface connected to a home access point, a scan for foreign access points and selecting a new access point from among the foreign access points;
   when the scan is complete, returning to the home access point and initiating a home channel dwell time;
   receiving data packets from the home access point during the home channel dwell time; and
   in response to a predefined criterion being met, connecting to the new access point prior to expiry of the home channel dwell time.

8. The method of claim 7, further comprising: when the data packets do not meet the predefined criterion, waiting for the home channel dwell time to expire; and in response to the expiry of the home channel dwell time, connecting to the new access point.

9. The method of claim 7, further comprising: determining that no further data packets will be received within the home channel dwell time, and in response, determining that the data packets meet the predefined criterion.

10. The method of claim 7, further comprising: determining that a most recently received data packet is received within a threshold time of an end of the home channel dwell time, and in response, determining that the data packets meet the predefined criterion.

11. The method of claim 10, wherein the threshold time is a predefined time interval between successive packets.

12. The method of claim 7, further comprising buffering data packets at the home access point during the scan.

13. A system comprising:
a home access point;
a mobile computing device connected to the home access point, the mobile computing device comprising:
a wireless communications interface;
a controller configured to:
control the wireless communications interface to initiate a scan of foreign access points and select a new access point from among the foreign access points;
when the scan is complete, control the wireless communications interface to return to the home access point and initiate a home channel dwell time;
control the wireless communications interface to receive data packets from the home access point during the home channel dwell time; and
in response to a predefined criterion being met, control the wireless communications interface to connect to the new access point prior to expiry of the home channel dwell time.

14. The system of claim 13, wherein controller is further configured to: when the data packets do not meet the predefined criterion, wait for the home channel dwell time to expire; and in response to the expiry of the home channel dwell time, connect to the new access point.

15. The system of claim 13, wherein the predefined criterion comprises a determination that no further data packets will be received within the home channel dwell time.

16. The system of claim 13, wherein the predefined criterion comprises a determination that a most recently received data packet is received within a threshold time of an end of the home channel dwell time.

17. The system of claim 16, wherein the threshold time is a predefined time interval between successive packets.

18. The system of claim 13, wherein data packets comprise data packets buffered at the home access point during the scan.

\* \* \* \* \*